United States Patent
Okada et al.

(10) Patent No.: US 8,172,125 B2
(45) Date of Patent: May 8, 2012

(54) VEHICLE DOOR FRAME AND METHOD OF PRODUCING THE SAME

(75) Inventors: Takayuki Okada, Kanagawa (JP); Kenji Shimizu, Kanagawa (JP); Go Yamane, Kanagawa (JP); Masaki Koyama, Kanagawa (JP)

(73) Assignee: Shiroki Corporation, Fujisawa-Shi (JP)

( * ) Notice: Subject to any disclaimer, the term of this patent is extended or adjusted under 35 U.S.C. 154(b) by 22 days.

(21) Appl. No.: 12/870,915

(22) Filed: Aug. 30, 2010

(65) Prior Publication Data

US 2011/0308171 A1   Dec. 22, 2011

(30) Foreign Application Priority Data

Jun. 18, 2010   (JP) ................. 2010-139446

(51) Int. Cl.
*B23K 31/02*   (2006.01)
*B60J 5/04*   (2006.01)
*E06B 3/00*   (2006.01)

(52) U.S. Cl. ............. 228/135; 228/256; 49/502; 49/506

(58) Field of Classification Search ........................ None
See application file for complete search history.

(56) References Cited

U.S. PATENT DOCUMENTS

| | | | | |
|---|---|---|---|---|
| 4,462,021 A | * | 7/1984 | Watanabe et al. | 341/118 |
| 5,024,480 A | * | 6/1991 | Petrelli | 296/146.9 |
| 5,992,021 A | * | 11/1999 | Takeda et al. | 29/897.2 |
| 2010/0015851 A1 | * | 1/2010 | Wu | 439/607.01 |
| 2011/0030282 A1 | * | 2/2011 | Ruppert et al. | 49/506 |
| 2011/0036017 A1 | * | 2/2011 | Moreton-Smith et al. | 49/493.1 |
| 2011/0099912 A1 | * | 5/2011 | Ohtake et al. | 49/502 |
| 2011/0302846 A1 | * | 12/2011 | Okada et al. | 49/502 |

FOREIGN PATENT DOCUMENTS

| | | | | |
|---|---|---|---|---|
| DE | 3340476 A | * | 5/1985 | |
| JP | 2005-053289 A | * | 3/2005 | |
| JP | 2010-012924 A | * | 1/2010 | |

* cited by examiner

*Primary Examiner* — Kiley Stoner
(74) *Attorney, Agent, or Firm* — Millen, White, Zelano, Branigan, P.C.

(57) ABSTRACT

A vehicle door frame includes first and second door frame members which are positioned end-to-end to be butt-welded to each other, wherein each of the first and second door frame members includes a design part, an enclosed section provided on a vehicle interior side, a connecting part which connects an inner surface of the design part with the enclosed section; and first and second dam protrusions which project from the inner surface of the design part and are positioned on opposite sides of the connecting part, respectively. Molten metal is present in the first and second spaces after the molten metal has melted and passed through the inner surface of the design part from the outer surface thereof upon butted ends of the first and second door frame members being butt-welded to each other from the outer surface of the design part.

3 Claims, 5 Drawing Sheets

VEHICLE DOOR FRAME AND METHOD OF PRODUCING THE SAME

BACKGROUND OF THE INVENTION

1. Field of the Invention

The present invention relates to a vehicle door frame made of a material such as an aluminum alloy (light alloy) and a method of producing the vehicle door frame.

2. Description of Related Art

In general, vehicle door frames are made by butt-welding (corner welding) ends (butted ends) of at least a pillar member (e.g., a vertical pillar sash member or a door frame member) and an upper sash member (door frame member). TIG welding or MIG welding is generally utilized to carry out such a welding process. An aluminum alloy extruded product tends to be mainly used as a material for the vehicle door frame instead of a conventional roll-formed product made of an iron-based material for the purpose of weight reduction. An example of such a method of producing a vehicle door frame is disclosed in Japanese Unexamined Patent Publication 2003-412525.

When aluminum-alloy door frame members are joined by welding, it is difficult to check the weld strength. More specifically, TIG welding or MIG welding is a process that joins base materials (base metals) together by melting these base materials while also melting a welding wire or a filler wire; however, it is visually impossible to check the degree (depth) of welding of the base materials merely by looking the surface of the welded portion.

SUMMARY OF THE INVENTION

The present invention has been devised in view of the above described problem of the related art and provides a vehicle door frame which makes visual inspection of the weld strength possible. The present invention further provides a method of producing such a vehicle door frame.

The present invention has been devised based on a reversed way of thinking in which if the welding operation continues to be performed to a degree until the molten metal melts through the inner surface (back/underside) from the outer surface (welding surface) (i.e., if the welding operation is performed excessively), the weld depth (weld strength) can be visually checked by visually recognizing that the molten metal has melted through the inner surface thereof (i.e., through to the other side).

According to an aspect of the present invention, a vehicle door frame is provided, including a first door frame member and a second door frame member which are made of light alloy and positioned end-to-end to be butt-welded to each other, wherein each of the first door frame member and the second door frame member includes a design part, an enclosed section provided on a vehicle interior side, a connecting part which connects an inner surface of the design part with the enclosed section; and a first dam protrusion and a second dam protrusion which project from the inner surface of the design part and are positioned on opposite sides of the connecting part, respectively, the first dam protrusion, the design part and the connecting part defining a first space therebetween and the second dam protrusion, the design part and the connecting part defining a second space therebetween. Ends of the first and second dam protrusions of the first door frame member and corresponding ends of the first and second dam protrusions of the second door frame member are respectively butt-positioned against each other when the butted ends of the first door frame member and the second door frame member are joined to each other by butt-welding. Molten metal is present in the first space and the second space after the molten metal has melted and passed through the inner surface of the design part from the outer surface thereof upon butted ends of the first door frame member and the second door frame member being butt-welded to each other from the outer surface of the design part.

In an embodiment, a method of producing a vehicle door frame is provided, including a first door frame member and a second door frame member which are made of light alloy and positioned end-to-end to be butt-welded to each other, the method including: forming the first door frame member and the second door frame member by extrusion molding so that each of the first door frame member and the second door frame member includes: a design part; a enclosed section provided on a vehicle interior side; a connecting part which connects an inner surface of the design part with the enclosed section; and a first dam protrusion and a second dam protrusion which project from the inner surface of the design part and are positioned on opposite sides of the connecting part, respectively; butting ends of the first door frame member and the second door frame member, each of the ends including the design part, the connecting part, the first dam protrusion and the second dam protrusion; setting at least one back plate on the inner surface of the butted ends of the first door frame member and the second door frame member so as to foLia a first molten metal trapping space between the first dam protrusion and the connecting part and a second molten metal trapping space between the second dam protrusion and the connecting part; and welding the butted ends of the first door frame member and the second door frame member from an outer surface of the design part until molten metal melts through the inner surface of the design part at the butted ends of the first door frame member and the second door frame and is trapped in the first molten metal trapping space and the second molten metal trapping space.

It is desirable for two back plates to be positioned on opposite sides of the connecting part, respectively.

According to the present invention, when the butted ends of the first door frame member and the second door frame member are butt-welded to each other, the weld strength (completion of the welding operation) can be visually checked by utilizing the occurrence of a phenomenon in which molten metal melts through the inner surface of the butted ends by an excessive welding operation, which makes it possible to achieve a high-strength vehicle door frame, the weld depth (weld strength) of which has been visually checked.

The present disclosure relates to subject matter contained in Japanese Patent Application No. 2010-139446 (filed on Jun. 18, 2010) which is expressly incorporated herein by reference in its entirety.

BRIEF DESCRIPTION OF THE DRAWINGS

The present invention will be discussed below in detail with reference to the accompanying drawings, in which.

DESCRIPTION OF THE EMBODIMENT

Figure 1:
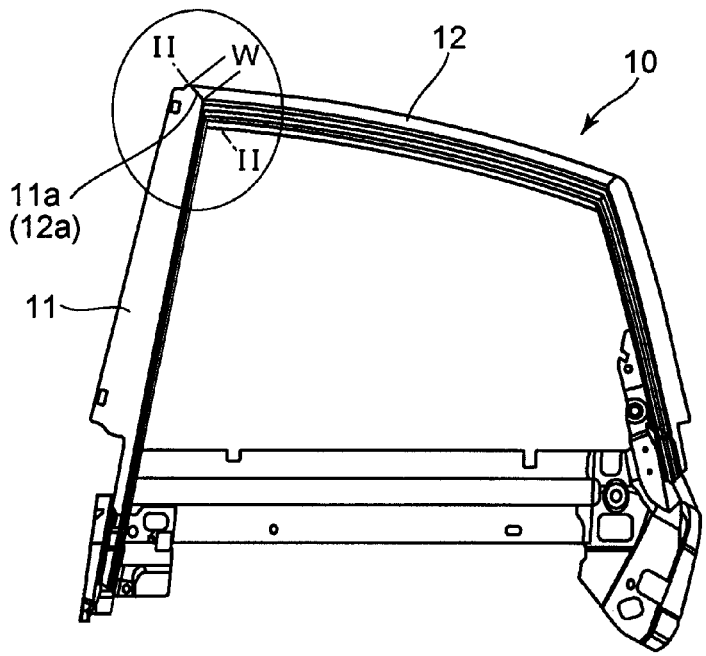
FIG. 1 is a side elevational view of a vehicle door frame according to the present invention.

FIG. 1 is a front (side) elevational view of a rear door frame (rear left door frame) 10, viewed from outside thereof, from among the door frames of a vehicle. The rear door frame 10 is provided with a rear pillar (pillar member/vertical pillar sash member/first door frame member) 11 and an upper sash (door frame member) 12 which are welded to each other by butt-welding (corner welding) the ends (butted ends) of the rear pillar 11 and the upper sash 12. The front door frame(s) (not shown) has substantially the same structure as that of the rear door frame 10.

The rear pillar 11 and the upper sash 12 are each formed as an aluminum alloy extruded product having a uniform cross sectional shape. The rear pillar 11 is provided at an upper end thereof with an obliquely-cut end surface 11a, and the upper sash 12 is provided at a front end thereof (i.e., toward the front of the vehicle) with an obliquely-cut end surface 12a. The obliquely-cut end surfaces 11a and 12a are butt-positioned to form butted ends of the rear pillar 11 and the upper sash 12 which are to be joined together by butt-welding. A section W (see FIG. 1; also shown by the double-headed arrow in FIG. 4) shows a section which is welded by TIG welding or MIG welding.

Figure 2:
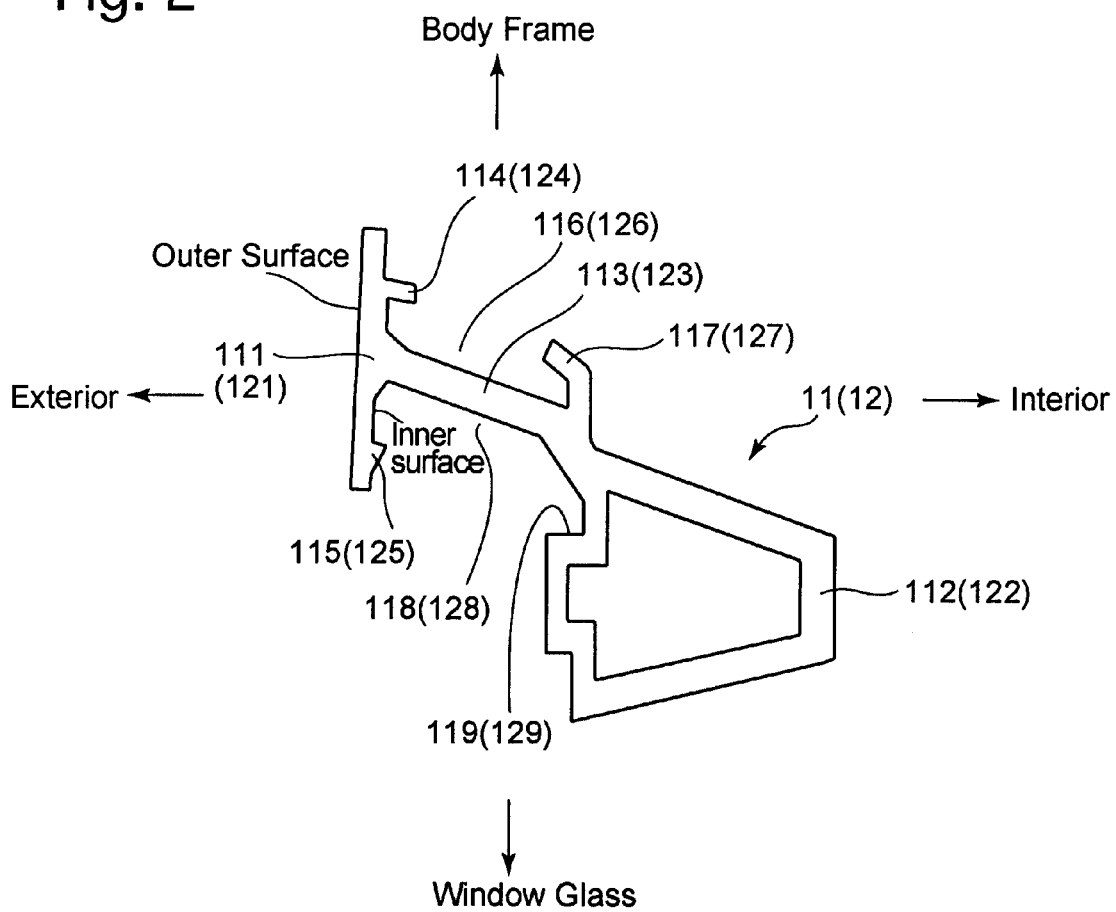
FIG. 2 is a cross sectional view of a door frame member of the vehicle door frame, taken along the line II-II shown in FIG. 1, showing a cross sectional shape thereof by way of example.
Figure 4:
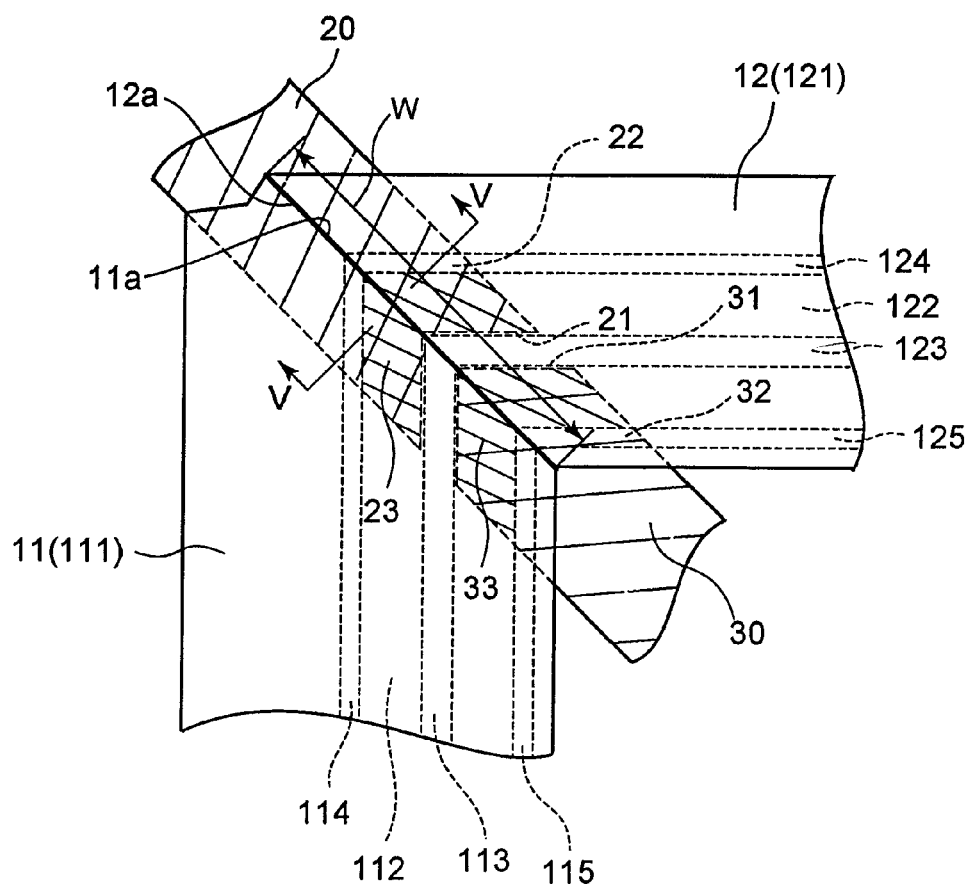
FIG. 4 is a front view as viewed in the direction of the arrow IV shown in FIG. 3, showing the front shape (shape in plan view) of each back plate.

The rear pillar 11 and the upper sash 12 have the same cross sectional shape in the section W that is shown in FIGS. 1 and 4. FIG. 2 shows an example of this cross sectional shape (however, FIGS. 2, 4 and 6 through 8 illustrate the shape of a cross section taken along a plane orthogonal to the longitudinal direction of the rear pillar 11 (the upper sash 12); and in the section W, the cross sectional shape appears to be longer in the vertical direction as viewed in a direction orthogonal to the obliquely-cut end surface 11a (12a)). The rear pillar 11 is provided with a design part 111, an enclosed section (hollow section) 112 and a connecting part 113, and the upper sash 12 is provided with a design part 121, an enclosed section (hollow section) 122 and a connecting part 123. The design part 111 constitutes part of an exterior surface of the door frame (rear door frame 10), the enclosed section 112 is positioned on the vehicle interior side and provides strength to the rear pillar 11, and the connecting part 113 connects the inner surface of the design part 111 and the enclosed section 112 to each other. Likewise, the design part 121 constitutes part of an exterior surface of the door frame (rear door frame 10), the enclosed section 121 is positioned on the vehicle interior side and provides strength to the upper sash 12, and the connecting part 123 connects the inner surface of the design part 121 and the enclosed section 122 to each other. The rear pillar 11 (the upper sash 12) is provided on the inner surface of the design part 111(121) on the vehicle-body frame side (upper side with respect to FIG. 2) of the connecting part 113(123) with a dam protrusion 114(124) and on the window-glass side (lower side with respect to FIG. 2) of the connecting part 113(123) with a dam protrusion 115(125). Hence, the dam protrusions 114 (124) and 115(125) are respectively positioned on opposite sides of the connecting part 113(123) with respect to a direction along the extending direction (i.e., a direction into the page of FIG. 2) of the connecting part 113(123). In addition, the rear pillar 11 (the upper sash 12) is provided, on the vehicle-body frame side (upper side with respect to FIG. 2) of the connecting part 113(123) in the vicinity of the enclosed section 112(122), with a groove-forming projection 117(127) which projects obliquely outwards (obliquely upwards with respect to FIG. 2) to form a weather strip groove 116 (126) between the groove-forming projection 117(127) and the dam protrusion 114(124), and is further provided, on a side of the enclosed section 112(122) which faces the design part 111(121), with a groove-forming projection 119(129) which forms a glass run groove 118(128) between the groove-forming projection 119(129) and the dam protrusion 115(125).

Figure 3:
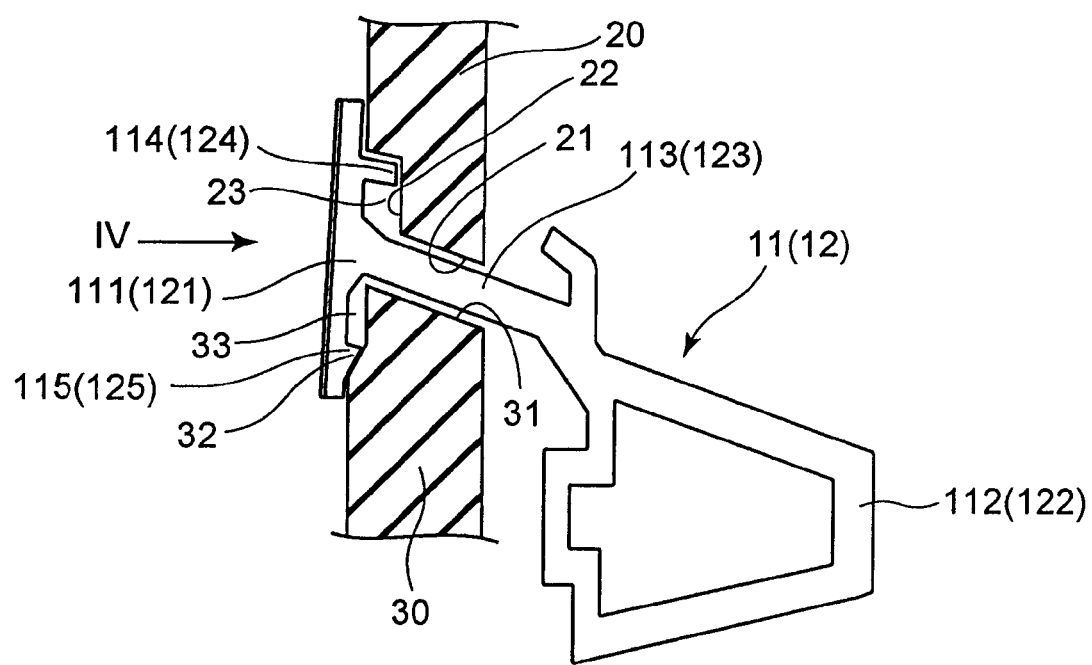
FIG. 3 is a view corresponding to FIG. 2, showing the door frame member and two back plates positioned on the back (inner surface) of the door frame member.

When the obliquely-cut end surfaces 11a and 12a are butt-welded to each other, two back plates 20 and 30 are positioned (set) immediately behind the butted ends of the rear pillar 11 and the upper sash 12 which are to be butt-welded to each other as shown in FIGS. 3 and 4.

As shown in FIG. 4, the back plate 20 is provided with a connecting-part contacting surface 21 that is shaped into a right-angular recess, in a plan view, which comes in contact with surfaces on the vehicle-body frame side of the connecting parts 113 and 123, and a blocking surface 22 which comes in contact with the dam protrusions 114 and 124. The connecting-part contacting surface 21 and the blocking surface 22 define a molten metal trapping space 23 between the connecting part 113(123) and the dam protrusion 114(124).

Similar to the back plate 20, the back plate 30 is provided with a connecting-part contacting surface 31 shaped into a right-angular protrusion, in a plan view, which comes in contact with surfaces of the connecting parts 113 and 123 on the window-glass side, and an blocking surface 32 which comes in contact with the dam protrusions 115 and 125. The connecting-part contacting surface 31 and the blocking surface 32 form a molten metal trapping space 33 between the connecting part 113(123) and the dam protrusion 115(125). In FIG. 4, each of the back plates 20 and 30 is hatched, and the molten metal trapping spaces 23 and 33 are hatched with different hatch lines on the hatch lines of the back plates 20 and 30.

Figure 5:
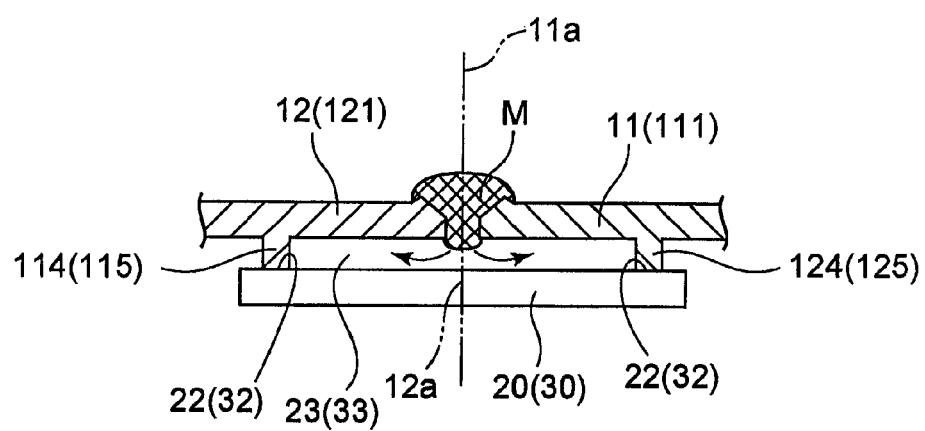
FIG. 5 is a cross sectional view taken along the line V-V shown in FIG. 4 and viewed in the direction of the appended arrows, showing a state where molten metal has melted through the inner surface of each design part by a welding operation performed from the outer surface of each design part.

In a state where the obliquely-cut end surface 11a of the design part 111 of the rear pillar 11 and the obliquely-cut end surface 12a of the design part 121 of the upper sash 12 are butt-positioned (with the dam protrusions 114 and 115 respectively butt-positioned with the dam protrusions 124 and 125) while the back plates 20 and 30 are set on the back (inner surfaces) of the butted ends of the rear pillar 11 and the upper sash 12, the butted end surfaces of the rear pillar 11 and the upper sash 12 are joined together by TIG welding or MIG welding along the butted ends (welding line/the section W) from the outer surfaces (upper surfaces with respect to FIG. 5) of the design parts 111 and 121. In this welding operation, at least portions at the butted ends in which the molten metal trapping spaces 23 and 33 are formed are welded to an excessive degree until the base metals of the rear pillar 11 and the upper sash 12 (and also filler wire or welding wire) melt through the inner surfaces (undersides as shown in FIG. 5) of the design parts 111 and 121. FIG. 5 schematically shows such an excessive welding manner. Molten metal which melts through and between the butt-positioned obliquely-cut end surfaces (butted ends) 11a and 12a of the design parts 11 and 12 enters the molten metal trapping spaces 23 and 33 to be trapped therein. Entrance of the molten metal (designated by a letter "M" in FIG. 5) into the molten metal trapping spaces 23 and 33 can be visually checked by removing the back plates 20 and 30, respectively. Accordingly, by visually monitoring the weld in such a manner, the rear pillar 11 and the upper sash 12 can be butt-welded to each other while ensuring sufficient weld strength.

Figure 6:
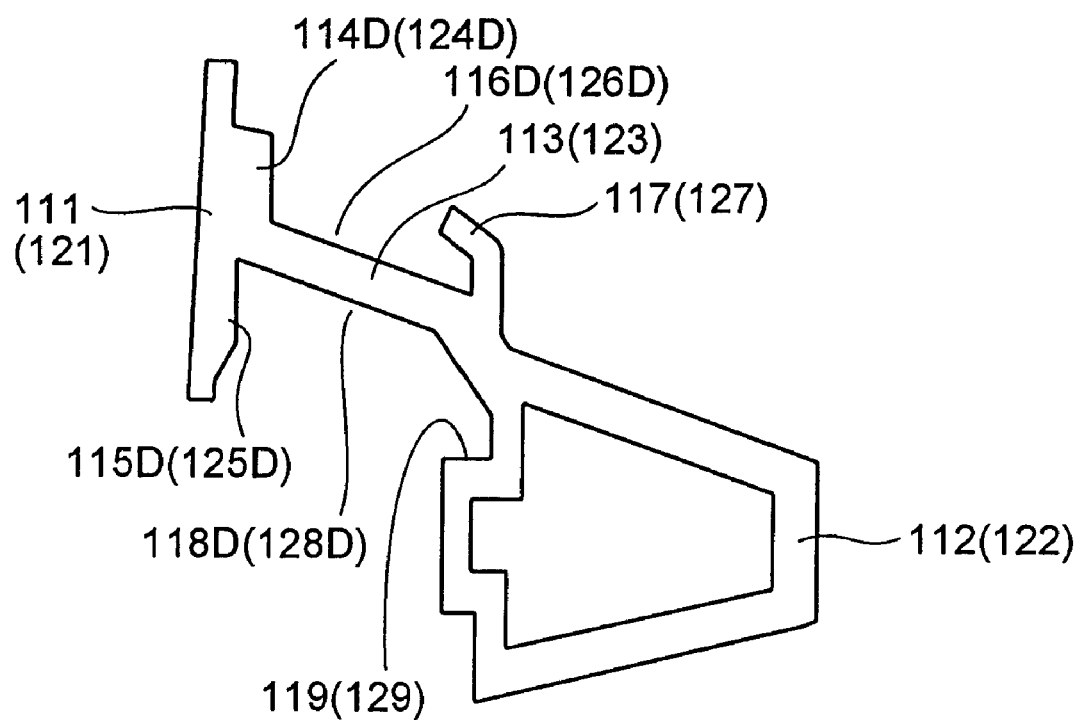
FIG. 6 is a view similar to that of FIG. 2, showing a cross sectional shape of the door frame member by way of example after the molten metal on both sides of the welded portion is smoothly finished.

After completion of the welding operation, welded traces (traces of molten metal) remain on both sides of the butted ends of the design parts 111 and 121, so that finishing (machining and polishing) is performed to remove the welded traces and smooth out the welded surfaces on both sides of the butted ends. FIG. 6 shows a cross sectional shape of the rear pillar 11 (the upper sash 12) by way of example after such welded traces are smoothly finished. As can be seen in FIG. 6, the molten metal trapping space 23, which is defined between the connecting part 113(123) and the dam protrusion 114 (124), and the molten metal trapping space 33, which is defined between the connecting part 113(123) and the dam protrusion 115(125), are each filled with molten metal in the vicinity of the obliquely-cut end surfaces 11a and 12a of the rear pillar 11 and the upper pillar 12. In other words, in the vicinity of the butt-welded ends of the rear pillar 11 and the upper sash 12, the dam protrusion 114(124) and the dam protrusion 115(125) have been transformed to a uniform-thickness portion 114D(124D) and a uniform-thickness portion 115D(125D) which are continuous with the connecting part 113(123), respectively. With this transformation, in the vicinity of the butt-welded ends of the rear pillar 11 and the upper sash 12, the weather strip groove 116(126) and the glass run groove 118(128) have also been transformed to a single-side-grooved glass run groove 116D(126D) and a single-side-grooved glass run groove 118D(128D), respectively.

Figure 7:
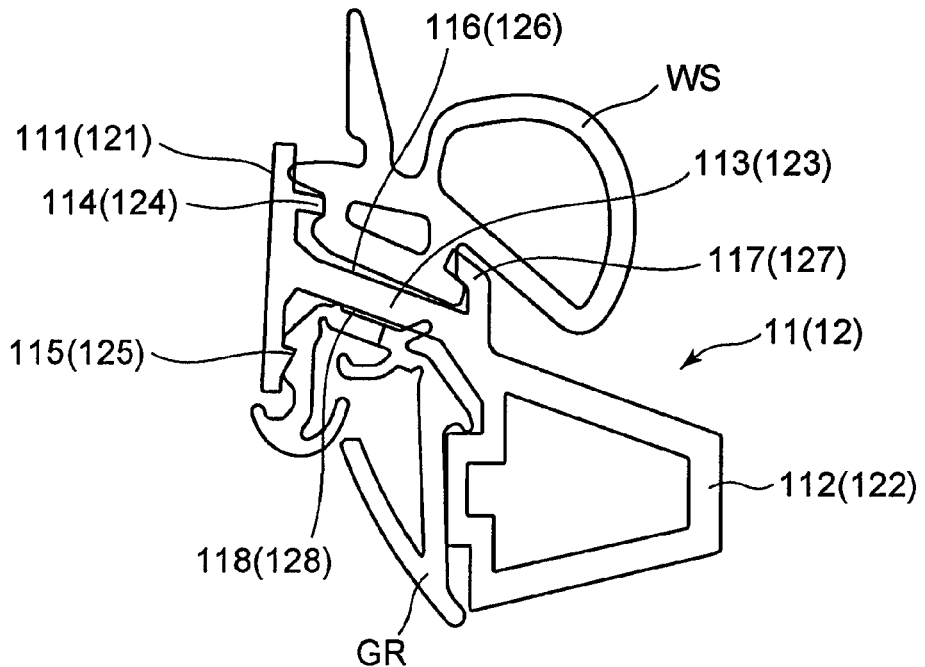
FIG. 7 is a cross sectional view of the door frame member (a portion thereof) having a cross sectional shape shown in FIG. 2, a weather strip and a glass run, showing a state where the weather strip and the glass run have been installed to the door frame member.
Figure 8:
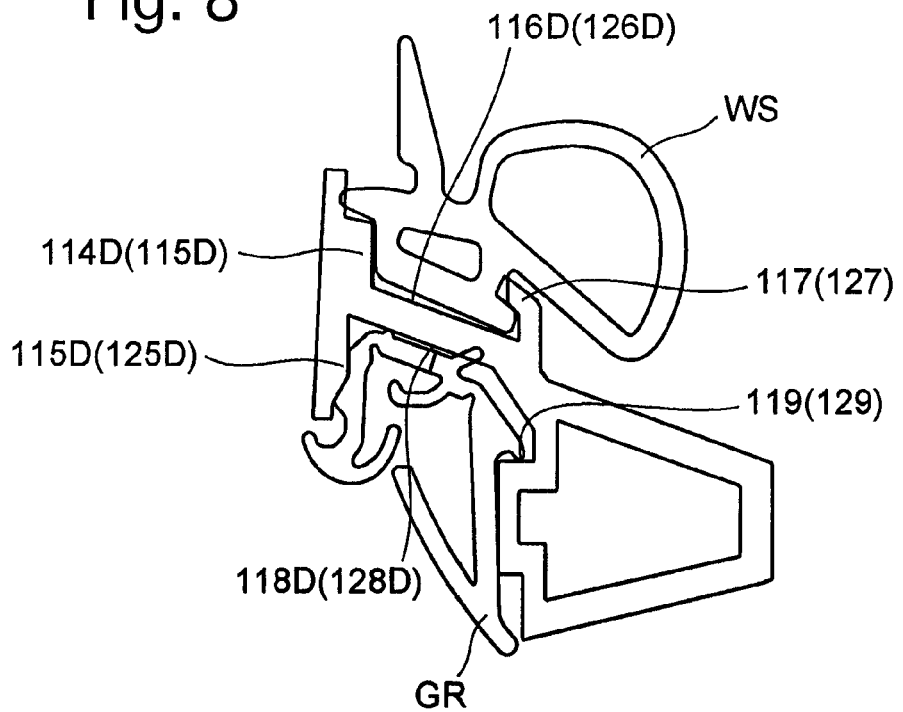
FIG. 8 is a cross sectional view of the door frame member (a portion thereof) having a cross sectional shape shown in FIG. 6, a weather strip and a glass run, showing a state where the weather strip and the glass run have been installed to the door frame member.

FIGS. 7 and 8 show a weather strip WS which is continuously inserted into the weather strip groove 116(126) and the single-side-grooved weather strip groove 116D(126D) and a glass run GR which is continuously inserted into the glass run groove 118(128) and the single-side-grooved glass run groove 118D(128D). As known in the art, the weather strip WS is a member which is positioned on the edge of a door frame (the rear frame 10) therealong and fills in the gap between the door frame and a door opening of the vehicle body when the door is closed, and the glass run GR is a member for guiding an edge of a movable window pane installed to the door frame. The weather strip WS can be made of a flexible material having a uniform cross sectional shape which can be deformed to correspond to the difference in shape between the weather strip groove 116(126) and the single-side-grooved weather strip groove 116D(126D), and the glass run GR can likewise be made of a flexible material having a uniform cross sectional shape which can be deformed to correspond to the difference in shape between the glass run groove 118(128) and the single-side-grooved glass run groove 118D(128D). Alternatively, it is possible for a portion of the weather strip WS which corresponds to the single-side-grooved weather strip groove 116D(126D) to be made to differ in shape (cross sectional shape) from the remaining portion thereof and for a portion of the glass run GR which corresponds to the single-side-grooved glass run groove 118D(128D) to be made to differ in shape (cross sectional shape) from the remaining portion thereof.

Although the present invention has been applied to a corner welding for joining the rear frame 11 and the upper sash 12 to each other in the above described embodiment, the present invention can also be applied to a corner welding for joining other door frame members to each other.

Obvious changes may be made in the specific embodiment of the present invention described herein, such modifications being within the spirit and scope of the invention claimed. It is indicated that all matter contained herein is illustrative and does not limit the scope of the present invention.

What is claimed is:

1. A vehicle door frame including a first door frame member and a second door frame member which are made of light alloy and positioned end-to-end to be butt-welded to each other,
wherein each of said first door frame member and said second door frame member comprises:
a design part;
an enclosed section provided on a vehicle interior side;
a connecting part which connects an inner surface of said design part with said enclosed section; and
a first dam protrusion and a second dam protrusion which project from the inner surface of said design part and are positioned on opposite sides of said connecting part, respectively, said first dam protrusion, said design part and said connecting part defining a first space therebetween and said second dam protrusion, said design part and said connecting part defining a second space therebetween,
wherein ends of said first and second dam protrusions of said first door frame member and corresponding ends of said first and second dam protrusions of said second door frame member are respectively butt-positioned against each other when said butted ends of said first door frame member and said second door frame member are joined to each other by butt-welding, and
wherein molten metal is present in said first space and said second space after said molten metal has melted and passed through the inner surface of said design part from the outer surface thereof upon butted ends of said first door frame member and said second door frame member being butt-welded to each other from the outer surface of said design part.

2. A method of producing a vehicle door frame including a first door frame member and a second door frame member which are made of light alloy and positioned end-to-end to be butt-welded to each other, said method comprising:
forming said first door frame member and said second door frame member by extrusion molding so that each of said first door frame member and said second door frame member includes: a design part; a enclosed section provided on a vehicle interior side; a connecting part which connects an inner surface of said design part with said enclosed section; and a first dam protrusion and a second dam protrusion which project from the inner surface of said design part and are positioned on opposite sides of said connecting part, respectively;
butting ends of said first door frame member and said second door frame member, each of said ends including said design part, said connecting part, said first dam protrusion and said second dam protrusion;
setting at least one back plate on the inner surface of said butted ends of said first door frame member and said second door frame member so as to form a first molten metal trapping space between said first dam protrusion and said connecting part and a second molten metal trapping space between said second dam protrusion and said connecting part; and welding said butted ends of said first door frame member and said second door frame member from an outer surface of said design part until molten metal melts through said inner surface of said design part at said butted ends of said first door frame member and said second door frame and is trapped in said first molten metal trapping space and said second molten metal trapping space.

3. The method of producing a vehicle door frame according to claim 2, wherein two of said back plates are positioned on opposite sides of said connecting part, respectively.

* * * * *